US008322744B2

(12) United States Patent
Ahnert et al.

(10) Patent No.: US 8,322,744 B2
(45) Date of Patent: Dec. 4, 2012

(54) STROLLER AND SEAT ASSEMBLY

(75) Inventors: Stephen Ahnert, Philadelphia, PA (US);
Patrick W. Laffan, Berwyn, PA (US);
Robert T. Pike, Cummings, GA (US)

(73) Assignee: Graco Children's Products Inc.,
Atlanta, GA (US)

( * ) Notice: Subject to any disclaimer, the term of this patent is extended or adjusted under 35 U.S.C. 154(b) by 344 days.

(21) Appl. No.: 12/724,133

(22) Filed: Mar. 15, 2010

(65) Prior Publication Data

US 2010/0259021 A1 Oct. 14, 2010

Related U.S. Application Data

(60) Provisional application No. 61/160,271, filed on Mar. 13, 2009.

(51) Int. Cl.
*B62B 7/00* (2006.01)

(52) U.S. Cl. .................. 280/642; 280/47.4; 280/650

(58) Field of Classification Search .................. 280/642, 280/643, 647, 648, 649, 650, 657, 658, 47.38, 280/47.4
See application file for complete search history.

(56) References Cited

U.S. PATENT DOCUMENTS

| | | | | |
|---|---|---|---|---|
| 6,863,296 B2 * | 3/2005 | Yoshie et al. | ................. | 280/642 |
| 7,717,456 B2 * | 5/2010 | Chen et al. | .................... | 280/642 |
| 7,766,366 B2 * | 8/2010 | Li | .............................. | 280/642 |
| 2006/0279070 A1 * | 12/2006 | Hou | .............................. | 280/643 |

FOREIGN PATENT DOCUMENTS

| | | |
|---|---|---|
| CN | 201062047 | 5/2008 |
| EP | 2 192 022 | 6/2010 |
| GB | 2 446 236 | 8/2008 |

OTHER PUBLICATIONS

Great Britain Examination Report issued in corresponding Great Britain Application No. 1004227.3 dated Jun. 22, 2011.
Instruction Manual for Quinny Buzz stroller, 39 pages, admitted prior art.
Instruction Manual for Bugaboo Cameleon, 44 pages, (2005).
Product Details for Bugaboo Frog stroller obtained from www.bugaboostrollers.com, 3 sheets, (2002).
Instruction Sheet for Kolcraft Contours Options 3 Wheeler Stroller, 36 pages, (2009).
User Guide for Maxi-Cosi Foray stroller, 24 pages, (2009).
Owner's Manual for Graco Quattro Tour Duo Stroller, 40 pages, (2007).
English translation of Chinese Office Action dated Jun. 24, 2011; 3 pages.
Chinese Office Action dated Jun. 24, 2011; 3 pages.
Great Britain Combined Search and Examination Report issued in corresponding Great Britain Application No. 1004227.3 dated Jul. 6, 2010.

* cited by examiner

*Primary Examiner* — John Walters
(74) *Attorney, Agent, or Firm* — Lempia Summerfield Katz LLC

(57) ABSTRACT

A stroller has a frame assembly, a seat assembly mounted to the frame assembly, and a hub assembly carried by the seat assembly. The hub assembly has a hub axis, a first hub part connected to the stroller, and a second hub part connected to the first hub part and to the seat assembly. A cup holder is connected to the first hub part. The second hub part and the seat assembly can be rotated about the hub axis relative to the first hub part to adjust a recline position of the seat assembly while the cup holder does not rotate therewith.

20 Claims, 11 Drawing Sheets

STROLLER AND SEAT ASSEMBLY

RELATED APPLICATION DATA

This patent is related to and claims priority benefit of U.S. provisional application Ser. No. 61/160,271 filed on Mar. 13, 2009 and entitled "Stroller with Releasable Seat." The above-noted related application is incorporated in its entirety herein by reference.

BACKGROUND

1. Field of the Disclosure

The present disclosure is generally directed to strollers, and more particularly to a stroller seat that has a release mechanism and a recline mechanism and that is reclinable on, releasable from, and reversible on a stroller.

2. Description of Related Art

Stroller performance standards include an 8 inch ball test. This test requires that an 8 inch diameter plastic ball be able to pass between the stroller seat (usually the seat bottom) and the passenger seat tray or child's tray, regardless of seat incline or recline, as the stroller is tilted forward. This requirement is intended to prevent a child's head from being caught or trapped between the tray and seat. This can happen if the child is improperly harnessed or not harnessed in the seat allowing them to slide down under the tray.

Many known strollers, and particularly U.S. domestic stroller models, have a child's tray that is attached to the frame sides of the stroller. The tray generally extends across the stroller frame in front of the child seat and usually includes one or more integrated cup holders. The tray typically stays stationary as the stroller seat is reclined. The tray is independent of the seat's reclining motion because on conventional fixed-seat strollers, only the rear surface or seat back of the seat can be reclined. Thus, the seat back moves independent of the seat bottom, the rest of the seat, the child's tray, and the stroller frame. This arrangement must pass the 8 inch ball test with the seat in any incline position.

Many existing strollers are offered as part of a travel system and, thus, allow an infant carrier or infant car seat (ICS) to be placed directly over and onto the child seat of the stroller. This allows the stroller to essentially be converted to one that can transport an infant that would otherwise be too young or too small to sit in the stroller's dedicated child seat. This ICS install feature creates the modular travel system. These types of strollers also employ a passenger or child's tray across the seat. On such strollers, the passenger or child's tray supports the head-end of the ICS when placed on the stroller. The foot end of the ICS is typically supported by the seat structure, such as by resting on the seat bottom of the stroller's dedicated child seat.

Many manufacturers have produced similar types of strollers and travel systems. Some of these strollers have replaced the passenger tray with an arm bar or transverse arm support extending across the front of the dedicated child seat on the stroller. The arm bar typically supports the head end of the ICS when mounted to the stroller.

Some manufacturers have produced strollers with a dedicated child seat that reclines in one-piece. In other words, the seat back and seat bottom both tilt in unison when inclined or reclined. Such seats may be removable or reversible as well. However, none of these other stroller designs with such removable or reversible seats are known to allow the ICS to be placed directly onto the toddler seat to create a travel system. These types of strollers are typically not compatible for mounting an ICS.

Also, virtually all of the removable or reversible stroller seats currently known in the market use a child arm bar rather than a child tray. The arm bar is affixed to the seat and not the stroller frame so as not to interfere with seat removal or replacement and so that the seat can pass the 8 inch ball test standard noted above. If a child's tray with cup holders were provided in place of the arm bar, it would also move with the seat when seat is reclined. This is because the seat bottom and the tray would move in unison with the seat back. If the tray were mounted to the seat, its contents would spill when the seat orientation, and thus the tray orientation, is altered during recline. If the tray were provided and mounted to the frame, the spill problem could be resolved. However, the gap between the seat and tray would vary when the seat is reclined, thus affecting the stroller's ability to meet the 8 inch ball test. Either there would be a small gap and thus no room for the child's legs between the seat bottom and tray with the seat in a reclined position, or there would be a large gap and thus the seat would fail the 8 inch ball test in the inclined position. Thus, an arm bar affixed to the removable seat is utilized instead of a tray affixed to the stroller frame in conjunction with such seats. These types of one-piece reclining seats, whether removable, reversible, or neither, therefore do not allow the child to have food/drink storage within easy reach.

Again, there are a number of strollers on the market that have removable, reversible toddler seats. These strollers typically have one or more release actuators for unlatching and removing the seat. The typical release actuator is located in an area that makes lifting the seat awkward, particularly if the seat is loaded with the weight of a child. In most cases, the release actuator is centered near the geometric midpoint of the seat frame. In contrast, the center-of-gravity of a small child is generally much closer to the head tube of the seat. The seat carrying a child thus has a center of gravity closer to the head end of the seat. This weight imbalance, combined with the hand position required to actuate the release mechanism prior to lifting the seat, makes grasping and lifting the seat awkward and/or difficult, particularly with the child in the seat. The awkward grip on the seat and the weight imbalance can potentially make it difficult for a parent or caregiver to keep the seat level during removal from the stroller. Manufacturers typically state that such a removable seat should not be removed or replaced from the stroller while a child is in the seat. However, it is possible that a consumer might ignore such a warning and remove and/or reverse the child's seating position with the child still seated in the seat.

SUMMARY

In one example according to the teachings of the present invention, a stroller has a frame assembly, a seat assembly mounted to the frame assembly, and a hub assembly carried by the seat assembly. The hub assembly has a hub axis, a first hub part connected to the stroller, and a second hub part connected to the first hub part and to the seat assembly. A cup holder is connected to the first hub part. The second hub part and the seat assembly can be rotated about the hub axis relative to the first hub part to adjust a recline position of the seat assembly while the cup holder does not rotate therewith.

In one example, the seat assembly can have an upper seat frame and a lower seat frame that rotate with one another when the recline position is adjusted.

In one example, the second hub part can connect a lower seat frame and an upper seat frame of the seat assembly to one another.

In one example, the seat assembly can be removable from and attachable to the stroller. The hub assembly and cup holder can remain connected to the seat assembly when removed.

In one example, the cup holder can have a part that is integrally molded as a portion of the first hub part.

In one example, the cup holder can have a cup holder ring that supports a receptacle.

In one example, the stroller can also have two of the hub assemblies spaced apart from one another on opposite sides of the seat assembly. The stroller can also have two of the cup holders, one connected to each of the two hub assemblies.

In one example according to the teachings of the present invention, a stroller has a frame assembly having a first seat mount, a seat assembly mounted to the frame assembly and having a second seat mount connected to the first seat mount, and a latch mechanism associated with the first and second seat mounts and biased to a latching position retaining the first and second seat mounts connected to one another. A release actuator is mounted to the seat assembly and is movable relative to the seat assembly to unlatch the latch mechanism. The seat assembly is removable from the frame assembly with the latch mechanism unlatched. The release actuator is positioned on the seat assembly above the second seat mount.

In one example, the first seat mount can be a male seat mount and the second seat mount can be a female seat mount configured to receive the male seat mount therein.

In one example, the second seat mount can be part of a hub assembly of the seat assembly. The hub assembly can have a hub axis about which the seat assembly can rotate to adjust a recline position of the seat.

In one example, the latch mechanism can include a latch pin movable along a hub axis of a hub assembly about which the seat assembly can rotate to adjust a recline position of the seat.

In one example, the seat assembly can have an upper seat frame and a lower seat frame coupled to one another by a hub assembly. The release actuator can be positioned above the hub assembly.

In one example, the release actuator can be coupled to the latch mechanism by cable.

In one example, the second seat mount can be part of a hub assembly having a connector coupled to an upper seat frame of the seat assembly. The release actuator can be mounted to the connector.

In one example, the latch mechanism can include a latch pin within the hub assembly. A cable can be connected to the latch pin and routed therefrom to the release actuator at least partly external to the seat assembly and the hub assembly.

In one example, the stroller can also have a pair of the first seat mounts spaced apart from one another across the frame assembly. The stroller can also have a pair of the second seat mounts spaced apart from one another across the seat assembly and each connected to a respective one of the pair of first seat mounts. The stroller can further have a pair of the latch mechanisms one each associated with a respective one of the first and second seat mounts. The stroller can also have a pair of the release actuators one each for releasing a respective one of the pair of latch mechanisms. Each release actuator can be positioned on the seat assembly above the respective second seat mount.

In one example according to the teachings of the present invention, a stroller has a frame assembly and a removable seat assembly mounted to the frame assembly. The seat assembly has a hub assembly with a first hub part connected to the frame assembly and a second hub part connected to the first hub part. The seat assembly is adjustable between at least two different recline positions. The stroller also has a recline latch mechanism biased to a latching position to retain the seat assembly in a selected one of the recline positions and a recline actuator on the seat assembly and coupled to the recline mechanism. The stroller can further have a recline cable coupled between the recline actuator and recline mechanism. The recline cable has a proximal end within the hub assembly that is split into a pair of cable ends each having a latch slug forming a part of the recline latch mechanism. The recline actuator can be actuated to move the cable, which moves the pair of cable ends and each of the latch slugs to a released position.

In one example, the stroller can have a cup holder connected to the first hub part. The second hub part and the seat assembly can be rotated about the hub axis relative to the first hub part to adjust between at least two recline positions while the cup holder does not rotate therewith.

In one example, the stroller can have two sets of recline notches opposing one another within the first hub part. Each set of notches can include a plurality of notches and each latch slug can be positioned to engage any notch of a respective one of the two sets of notches.

In one example, the seat assembly can have an upper seat frame. The recline actuator can be coupled to a top end of the upper seat frame.

BRIEF DESCRIPTION OF THE DRAWINGS

Objects, features, and advantages of the present invention will become apparent upon reading the following description in conjunction with the drawing figures, in which:

FIG. 6 shows a cross section taken along line VI-VI in FIG. 4 of a release cable guide of the left side seat hub.

DETAILED DESCRIPTION OF THE DISCLOSURE

The disclosed stroller seat assembly and stroller solve or improve upon one or more of the above-noted and/or other problems and disadvantages with prior known strollers and stroller seats. In one example, the disclosed seat assembly is removable from the frame assembly of the stroller. In one example, the cup holders are carried by the seat assembly and removable therewith as a part of the assembly. In one example, the seat assembly is reversible and can be mounted to the frame assembly in a forward facing or normal seat facing orientation and can be mounted to the frame assembly in a reverse, rear facing seat orientation. In one example, the disclosed seat assembly has a release mechanism with an actuator positioned under the seat frame and above the seat hub on the assembly. In one example, the seat release mechanism is readily accessible from above the seat. In one example, the seat assembly can be released by actuating the release mechanisms and lifted from the frame assembly without the user having to release their grip on the seat assembly. In one example, the seat release mechanism is positioned more in line with the seat center of gravity when a child is seated in the seat. Thus, if the seat is removed with or without a child, the seat will be relatively stable and easy to lift and carry and much less likely to tip unintentionally.

In one example, the disclosed stroller seat assembly has integrated cup holders as part of the seat hub assemblies. The incline or recline angle of the disclosed seat assembly can be adjusted to different orientations without affecting the orientation of the cup holders. The child seat has no tray but can have one or more of the disclosed cup holders that are readily accessible by a child seated in the seat. The disclosed cup holders do not interfere while incline or recline of the seat is adjusted nor during use after adjustment. Further, the cup holders are not directly mounted to the stroller frame but instead are mounted to the seat. In addition, the cup holders are accessible by the child regardless of seat facing direction. Still further, the cup holders will not spill when the seat is reclined.

Figure 1:
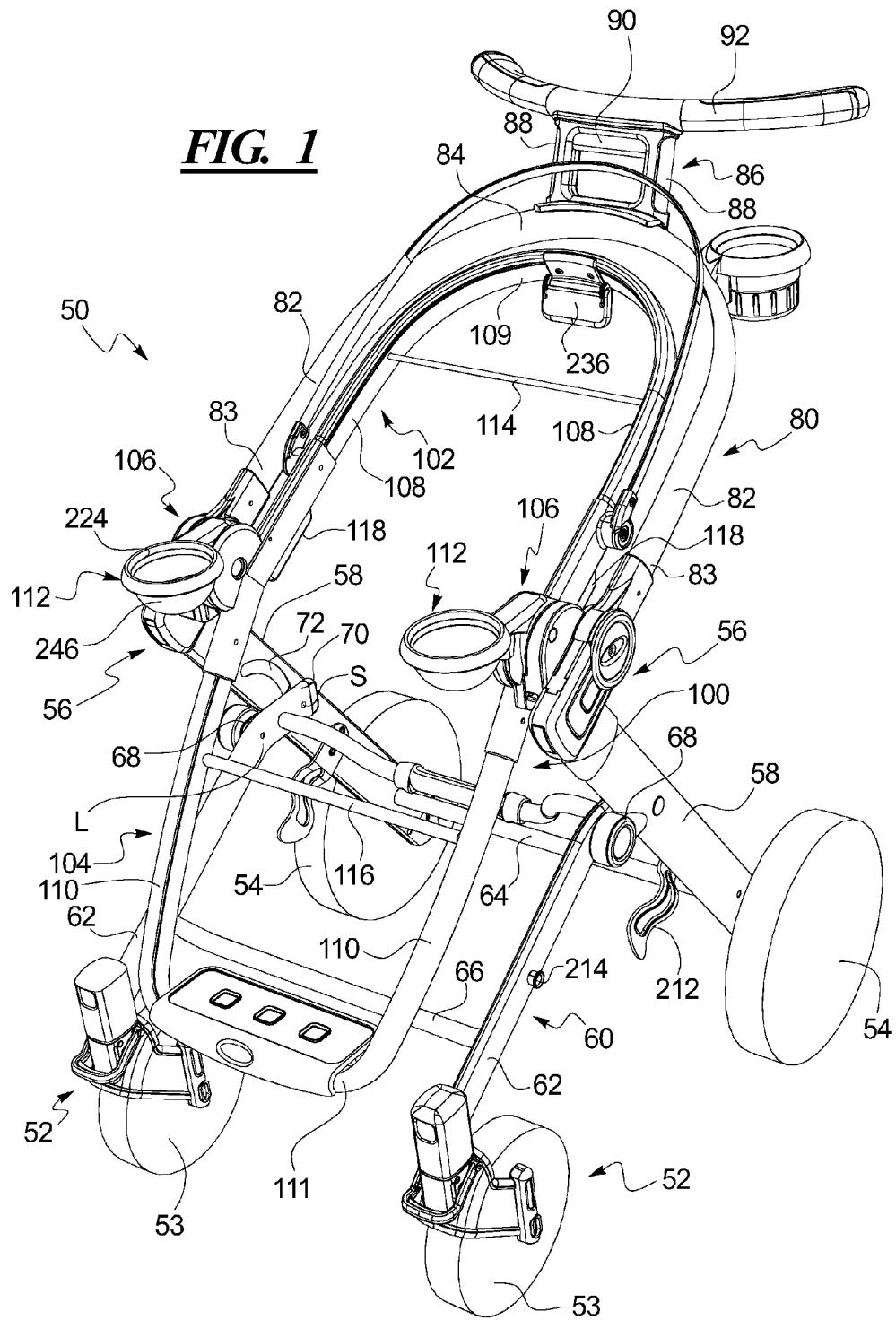
FIG. 1 shows a top, front, and left side perspective view of one example of a stroller constructed in accordance with the teachings of the present invention, the stroller being shown without soft goods and in an in-use configuration.

Turning now to the drawings, FIG. 1 shows one example in perspective view of a stroller 50 constructed in accordance with the teachings of the present invention. As described below, the stroller 50 can be reconfigurable between an in-use or set-up configuration, as depicted in FIG. 1, and a folded or compact configuration (not shown herein). The disclosed stroller 50 has but one of many alternate frame assembly shapes and configurations that could be employed within the spirit and scope of the present invention. In the disclosed example, the stroller 50 has a frame assembly or chassis 51 supported by a pair of front wheels assemblies 52, each having one or more front wheels 53, and a pair of rear wheels 54, each of which can be constructed in a conventional manner. In this example, the frame assembly or chassis 51 has a pair of opposed frame sides, each with a pivotable frame fold joint 56 interconnecting various components of the frame assembly. Each frame side in this example has a rear leg 58 laterally spaced from the rear leg of the other frame side and extending down and angled rearward from the corresponding fold joint 56 on the respective side. A lower end of each rear leg 58 is coupled in a conventional manner to one of the rear wheels 54.

A stroller is conceivable within the spirit and scope of the invention that has a different frame structure with no distinct pair of frame sides. It is also conceivable that the disclosed invention could be employed on a stroller with only one frame fold joint or more than two frame fold joints. As noted below, it is also conceivable that the disclosed invention could be employed utilizing alternate frame assemblies structures and components, different from the example disclosed and described herein.

In this example, the frame assembly 51 has a front leg assembly 60 that is constructed to form a pair of laterally spaced apart front legs 62. Each front leg 62 extends forward and downward on its respective frame side. Each front leg 62 terminates at a forward end attached in a conventional manner to one of the front wheel assemblies 52. The front leg assembly 60 also includes a transverse cross-bar 64 and a transverse cross-brace 66. The cross-bar 64 interconnects the opposed rear ends of the two front legs 62. The cross-brace 66 is located spaced from both the forward and rear ends of the front legs 62 and extends transversely between the front legs. Each of the front legs 62 is pivotally coupled at a leg pivot L to a stand-off 68 that projects forward from the respective rear leg 58. A leg stub 70 is formed or created at the rearward end of each front leg 62 by a portion of each front leg extending beyond the pivot L. The distal or free end of the stub 70 on each frame side is pivotally connected to the respective rear leg 58 at a pivot S, which is slidable along a curved track or slot 72 on the inner facing side of the respective rear leg.

In the disclosed example, the frame assembly 51 also includes a handle assembly 80 extending upward and rearward from the fold joints 56. The handle assembly 80 generally has a pair of laterally spaced apart push bars 82, one coinciding with each frame side. Each push bar 82 has a lower end 83 joined to a respective one of the fold joints 56 as described below. The handle assembly 80 is a continuous U-shaped structure including the two push bars 82 and a curved top or end bar 84, which extends transversely between and connects the upper ends of the push bars 82. In the disclosed example, a stanchion assembly 86 extends upward and rearward from the end bar 84 of the handle assembly 80. The stanchion assembly 86 has a pair of laterally spaced apart connector columns 88, which project further rearward away from the end bar 84. A latch actuator or fold actuator 90 is positioned between the columns 88 and spaced from the end bar 84. A handle bar 92 or handle is coupled to the distal ends of the columns 88 and spaced from the end bar 84. In this example, the actuator 90 is carried on an underside of the handle bar 92 between the stanchion columns 88.

In general, the actuator 90 can be pulled by a user inward or upward into the handle bar 92. This movement of the actuator 90 can pull on cables (not shown herein) running from the actuator, through the stanchion assembly 86, the end bar 84, and push bars 82, to the fold joints 56. The cables release latches in the fold joints 56 (as discussed briefly below). Upon release of the latches, the stroller frame assembly 51 can be folded. The fold joints 56 and release of same is described to some degree below. However, details, features, and aspects of the fold joints are described in greater detail in co-pending U.S. patent application Ser. Nos. 12/410,243 entitled "Foldable Stroller and Fold Interlock Mechanism" and 12/610,902 entitled "Foldable Stroller and Fold Linkage for Same. Each of these co-pending applications is incorporated in its entirety herein by reference.

In this example, the handle bar 92 is generally C-shaped with an arcuate or curved configuration. The curvature is arranged so that the handle bar 92 is concave toward the direction of the back end of the frame assembly 51. Any part of the handle bar 92 may be grasped by the caregiver to push the stroller. The concave curvature of the handle bar 92 also allows the caregiver to step forward, closer to the stroller, and thus closer to the child seat occupant, during use of the stroller 50. The shape, configuration, and construction of the handle bar 92 and the actuator 90 can vary and yet function satisfactorily for the purposes of the disclosed invention. For example, the handle bar 92 can be a linear element, be a multi-part structure, have an oval hoop shape, employ umbrella-type handles, or be an otherwise complexly curved structure. In addition, the actuator 90 can be placed on the end bar 84, on or between the columns 88, on a different part of the handle bar 92, or the like. Further, the actuator 90 can require a rotary action, a linear pull or squeeze, can be a pivoting lever, or the like. Various forms of these types of actuators are known in the stroller art.

Figure 2:
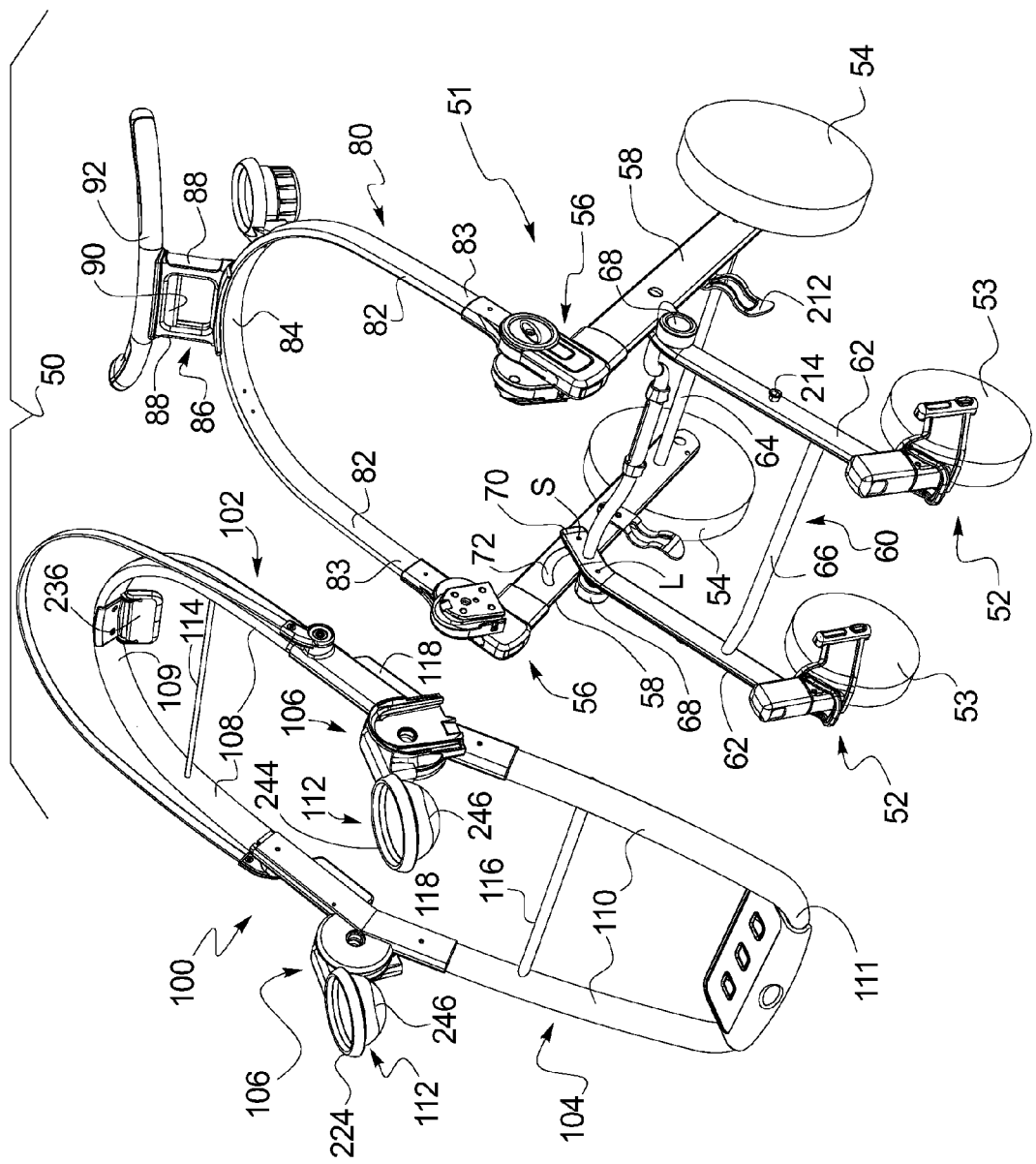
FIG. 2 shows the stroller in FIG. 1 with the seat assembly exploded from the frame assembly of the stroller and in a forward facing seat orientation.
Figure 3:
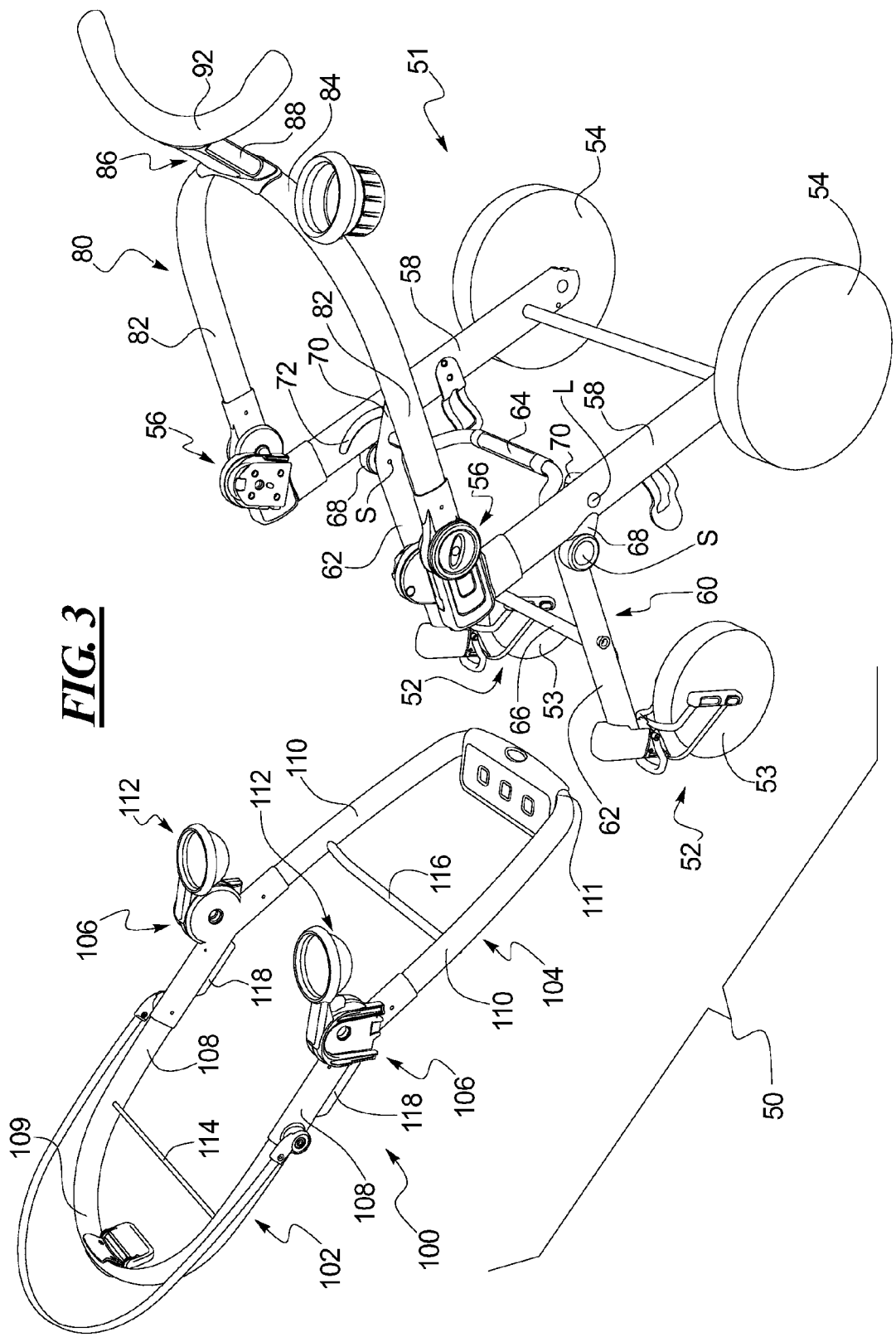
FIG. 3 shows the stroller in FIG. 2 with the seat assembly exploded from the frame assembly and in a rear facing seat orientation.

As shown in FIGS. 1-3, the stroller 50 in this example has a removable child support structure in the form of a toddler seat or seat assembly 100. The seat assembly 100 can be attached to and removed or detached from the frame assembly 51 in this example. As shown in FIG. 3, the seat assembly 100 in this example is optionally reversible and can be mounted to the frame assembly 51 in a rearward seat facing direction or reverse orientation. Thus, the seat assembly 100 is repositionable between at least three positions or states: 1) a first usable state, as in FIG. 1, as a seat to support a child on the frame assembly 51 in a forward seat facing direction in the in-use configuration; 2) a second usable state, as represented in FIG. 2, as a seat to support a child on the frame assembly 51 in a rearward seat facing direction in the in-use configuration; and 3) an unusable state, as in FIG. 2, detached or removed from the frame assembly 51 and thus not usable as a seat on the frame assembly. The seat assembly 100 depicted herein is shown without soft goods or seating surfaces. In use, the seat would have a seat structure defining a seat back and seat bottom as commonly known in the art for such a toddler-type seat. The seat is not shown herein attached to the frame assembly 51 in the reverse orientation, but for the purposes of the present invention would attach and function essentially in the same manner as shown and described herein with respect to the forward seat facing direction. In this example, the seat assembly 100 is not a foldable structure and thus would be removed prior to folding the frame assembly 51.

The seat assembly 100 is best illustrated in FIGS. 2 and 3 and has an upper seat frame 102, a lower seat frame 104, and a pair of connecting structures or hub assemblies 106 located on the opposed sides of the assembly. The hub assemblies 106 connect the upper and lower frames 102, 104 to one another and also mount the seat assembly 100 to the frame assembly 51. In general, the upper frame 102 would support and/or define a seat back part in conjunction with other components (not shown) of the seat assembly. Similarly, the lower seat 104 would support and/or define a seat bottom part in conjunction with other components (not shown) of the seat assembly. In this example, each of the seat frames 102, 104 is a U-shaped structure. The upper frame 102 generally follows the contour of, but is sized to nest within, the handle assembly 80. The upper seat frame 102 has a pair of spaced apart frame legs 108 that terminate at lower ends, which connect to the respective hub assemblies 106. The legs 108 are connected at the top of the upper seat frame 102 by a curved cross member 109. Similarly, the lower seat frame 104 has a pair of spaced apart frame legs 110 that terminate at upper ends, which also connect to the respective hub assemblies 106. The legs 110 are connected at the bottom end of the lower seat frame 104 by a curved cross member 111.

In the disclosed example, a cup holder 112 is connected to and extends forward from each of the hub assemblies 106. These cup holders 112 can be eliminated or can be replaced by some other structure such as a removable arm bar, a removable child tray, an ICS adapter for mounting an infant carrier on the frame assembly 51, or the like. Aspects and features of the cup holders 112 in this example are described in greater detail below. In addition, the upper seat frame 102 has a cross-brace 114 extending between the frame legs 108. The lower seat frame 104 has a similar cross-brace 116 extending between the frame legs 110. The cross-braces 114, 116 can optionally support portions of a seat back and seat bottom, respectively, during use of the seat assembly and can provide rigidity and strength to the overall seat structure.

The seat assembly 100 also has a pair of release mechanisms, one on each side of the assembly and associated with each of the hub assemblies 106. Each release mechanism has a release lever or actuator 118 positioned on the underside of the seat assembly near the respective hub assembly 106 on a side or end adjacent the corresponding upper seat frame leg 108. The release actuators 118 are actuated to remove the seat assembly 100 from the frame assembly 51 as represented in FIG. 2 and as discussed below.

The seat assembly 100, including the upper and lower seat frames 102, 104, the hub assemblies 106, and the release actuators 118, can vary in configuration and construction within the spirit and scope of the present invention. The overall shape of the seat assembly can also vary. The shape and configuration of the hub assemblies 106, as well as the location, shape, and function of the release actuators 118, can also vary. In addition, the seat assembly 100 in this example, as well as the seat assembly in the subsequent example disclosed herein, can be removed and replaced by other child support structures. For example, an ICS adapter for mounting a car seat, carrier, or carry cot can be attached to the frame assembly 51 in place of the seat assembly 100. Alternatively, a direct mount car seat, carrier, carry cot, or other child support structure can be attached to the frame assembly in the same or a similar manner as the seat assembly 100 as described herein.

The terms inward, inner, inside, and the like are used herein to refer to the side of a component positioned, arranged, oriented, or facing the middle of the stroller (i.e., toward the other side of the stroller frame). The terms outer, outward, outside, and the like are used herein to refer to the side of a component positioned, arranged, oriented, or facing the exterior of the stroller frame or away from the stroller. These descriptive terms will help in understanding the component relationships described herein and assist in reviewing the drawing figures.

Figure 4:
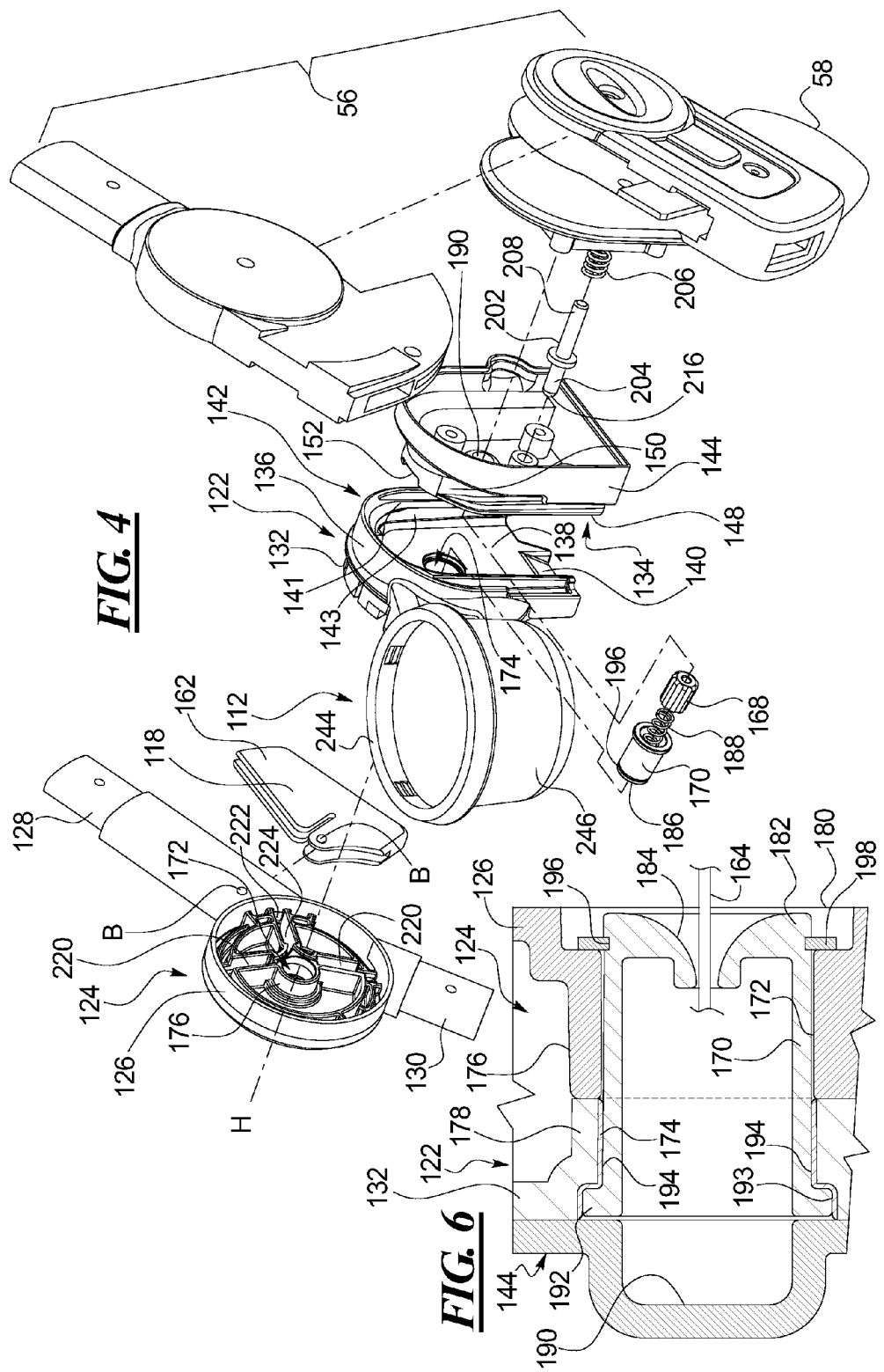
FIG. 4 shows an exploded view of the left side seat hub of the seat assembly shown in FIGS. 1 and 2.
Figure 5:
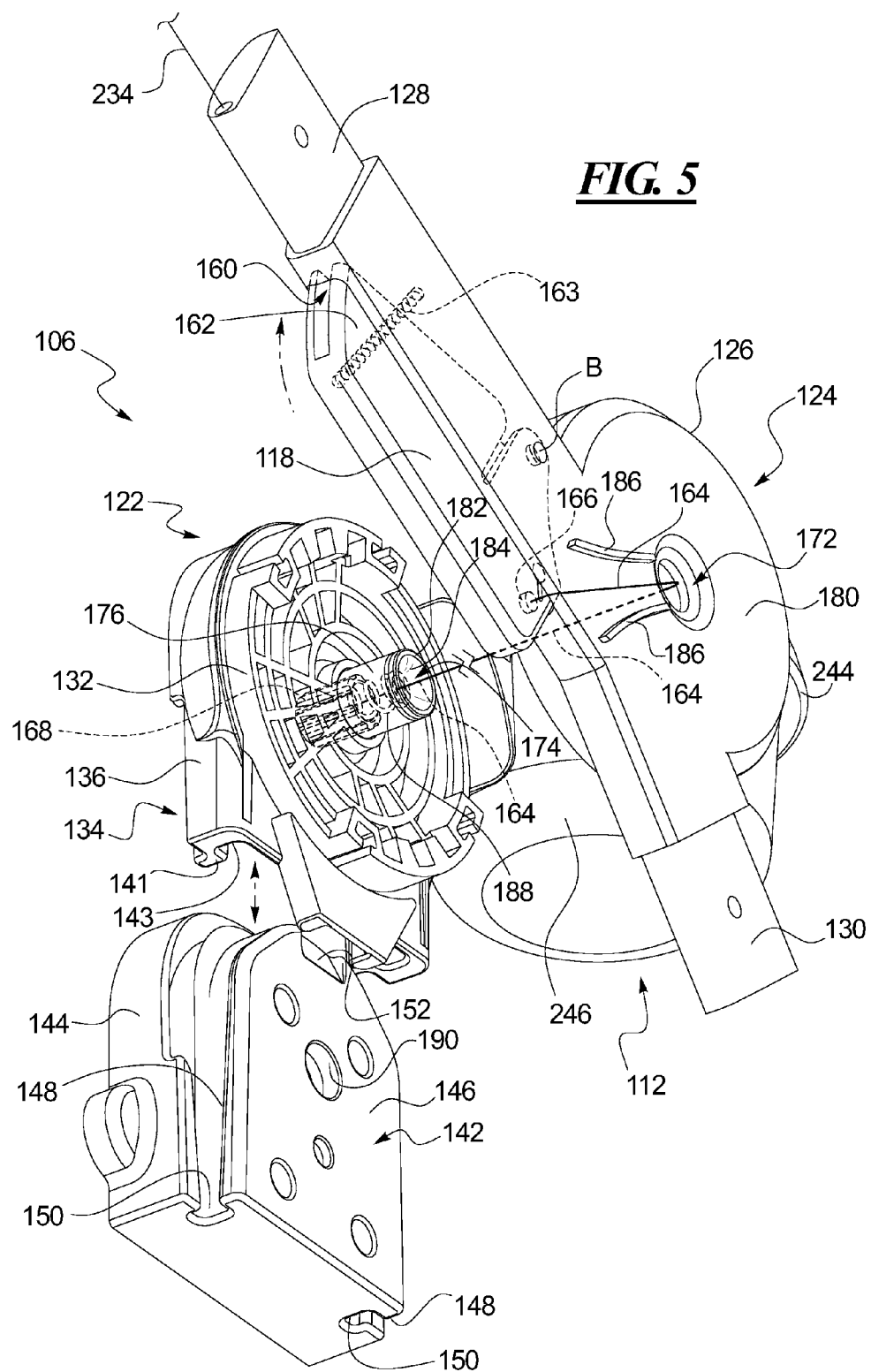
FIG. 5 shows a bottom, inside perspective view of the left side seat hub of the seat assembly shown in FIGS. 1 and 2.

FIGS. 4 and 5 show alternate close-up exploded views of part of the left side fold joint 56 of the frame assembly 51 and the left side hub assembly 106 of the seat assembly 100 and depict the major components for each. The right side fold joint 56 and hub assembly 106 are essentially identical and thus will not be described in detail herein. The description of the left side components provided herein is equally applicable to the right side components in the disclosed example.

The hub assembly 106 of the seat assembly 100 generally has a hub housing 120 with a first hub part 122 and a second hub part 124 joined to one another to form the housing. In this example, the first hub part 122 is an outer hub part positioned outward of the second hub part 124, which in this example is an inner hub part of the housing. The inner hub part 124 forms a frame connector with an inner center hub 126, an upper connector 128 extending radially from the inner center hub, and a lower connector 130 extending radially from the inner center hub in a direction generally opposite the upper connector. The upper connector 128 is configured to connect with a free end of the seat frame leg 108 of the upper seat frame 102. The upper connector 128 can vary in construction, but in one example can have a portion telescopically received in an open end of the seat frame leg 108. Fasteners can be used to secure the two components together. Similarly, the lower connector 130 is configured to connect and fasten to a free end of the seat frame leg 110 on the lower seat frame 104, but can also vary from the example shown.

In this example, the outer hub part 122 has an outer center hub 132 connected to the inner center hub 126 to form the hub housing 120. A female seat mount 134 in this example is positioned on the outer facing side of the outer center hub 132. The female seat mount 134 has an outer facing side that forms an inverted, U-shaped, female coupling with an outward extending, upstanding coupling wall 136 that surrounds on three sides a generally flat face 138 of the mount. The coupling wall has a rounded top and linear parallel side. The female seat mount 134 is open at the bottom and has a chamfer or ramp 140 disposed at an open bottom edge of the flat face 138. A lip 141 projects inward from the free edge of the coupling wall 136 creating a guide groove or undercut 143 on each of the linear side portions of the coupling wall 136 and under the rounded top of the coupling wall.

A male seat mount 142 projects from and is affixed to the exterior, but inner facing, side of a shell cover 144 on part of the fold joint 56. In this example, the male seat mount 142 defines a mounting point for attaching the seat assembly 100 or other child support structure to the frame assembly 51. The male seat mount 142 has a complementary U-shaped coupling 146 protruding from the shell cover 144 that engages and seats within the coupling wall 136 of the female seat mount 134. The male coupling 146 is also U-shaped and has a rounded top and linear sides and has a radially protruding rib 148 that extends from the top and sides. The rib 148 is spaced inward from a surface of the shell cover 144 and creates a track 150 around the top and sides of the male coupling 146. The male coupling 146 seats in the female coupling wall 136 when the seat assembly 100 is lowered onto the male seat mount 142. In addition, the rib 148 seats in the undercut or groove 143 and the lip 141 seats in the track 150 when the male and female seat mounts 134, 142 are connected. The rounded top of the male couple 146 also has a chamfer or ramp 152.

In this example, the release actuator 118 is received in a slot 160 (see FIG. 5) under the upper connector 128. In this example, the release actuator 118 is in the form of an elongate lever. The release actuator 118 is pivotally connected at one end at a pivot B to the connector 128. An opposite action end 162 of the actuator 118 has a grip edge and is free to be drawn upward into the upper connector 128, pivoting about the pivot B, by squeezing the grip edge of the actuator. The action end 162 is biased outward or downward away from the upper connector 128 by a spring 163 and is squeezed against the bias force of the spring for actuation. The release mechanism also includes a release cable 164 having one free end coupled to the one end of the release actuator 118 via a cable slug. The other free end of the release cable 164 has a second slug (not shown) seated within a latch pin 168, connecting the cable to the pin. In this example, the latch pin 168 is a splined shaft as shown in FIG. 4 slidably seated within a cylindrical bushing 170. The inner and outer center hubs 126, 132 each have a respective bore 172, 174 aligned with one another through the hub housing 120 and define a center axis H of the hub assembly 106. The bushing 170 is positioned and aligned along the hub axis H. The bushing 170 is seated in a well 176 on an interior, but outward facing, surface of the inner center hub 126 and a corresponding well 178 on an interior, but inward facing, surface of the outer center hub 132. The hub axis H is generally perpendicular to the frame connectors 128, 130.

As shown in FIG. 5, the release cable 164 is routed from the one end of the actuator 118 to the exterior, but inward facing, surface 180 of the inner center hub 126 of the hub housing 120. The surface 180 can be curved so as to smoothly, gradually guide the cable 164 from the actuator toward the bore 172. As shown in FIG. 6, the bushing 170 has a cable guide end 182 that coincides positionally with the surface 180. The guide end 182 has a curved entry surface 184 that is smoothly contoured but generally funnel shaped. The surface 184 on the guide end 182 of the bushing 170 guides the cable 164 into the bores 172, 174 without creating a sharp bend in the cable and reroutes the cable from being essentially perpendicular to the hub axis H to parallel and co-linear with the axis. Also as shown in FIG. 5, a pair of cable guides 186 is positioned spaced apart along the surface 180 on the exterior of the inner center hub 126. The guides 180 are spaced from one another, are curved, and converge toward one another moving toward the hub axis H. The guides 186 stand off of the surface 180 and help direct the release cable 164 from the actuator 118 to the bore 172. The guides 186 also help keep the release cable aligned between these two points to inhibit cable binding or the like As shown in FIG. 4, the release mechanism also has a spring 188 housed within the bushing 170. The spring 188 bears against the guide end 182 within the interior of the bushing 170 and biases the latch pin 168 outward toward the male seat mount 142 so that it normally protrudes outward from the flat face 138 on the female seat mount 134. The bore 174 of the male seat mount 142 aligns with a latch opening, or in this case a blind latch receptacle 190 provided in the shell cover 144 and also aligned with the hub axis H. As shown in FIG. 6, the bushing 170 has a flange or shoulder 192 of a larger diameter than the bushing and that protrudes circumferentially around the end opposite the guide end 182. The bore 174 has a corresponding step 193 on its outer end. The step 193 has a larger diameter than the bore 174 and the shoulder 192 seats therein when assembled. A fitting or sleeve 194 is seated in the step 193 and into the bore 174 beyond the step. The fitting 194 can help retain the bushing 170 during assembly by creating a press fit tolerance arrangement between the bore 174, fitting 194, bushing 170, shoulder 192, and step 193. An external groove 196 is provided around the circumference of the bushing 170 near the guide end. A retaining or snap ring 198 is received in the groove after assembly of the components.

As will be evident to those having ordinary skill in the art, the configuration and construction of these various features and components at the latch mechanism location can vary within the spirit and scope of the present invention. The number, shape, and arrangement of these parts, including the bushing 170, bores 172, 174, wells 176, 178, receptacle 190, and the like can be altered from the example shown and described herein.

Figure 7:
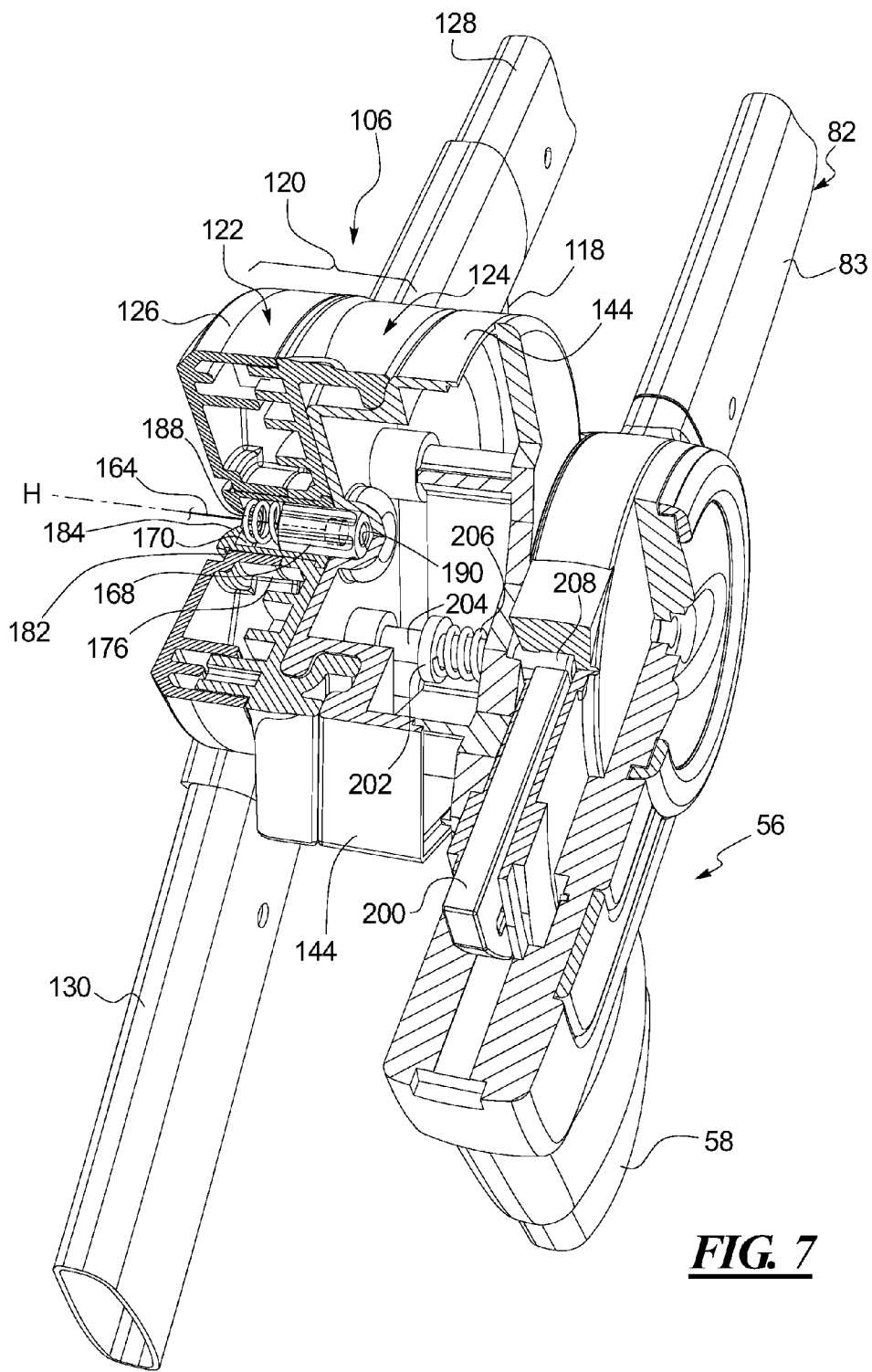
FIG. 7 shows a fragmentary cross section of the left side seat hub and fold joint of the stroller shown in FIG. 1 and with the seat assembly latch in a latched condition.
Figure 8:
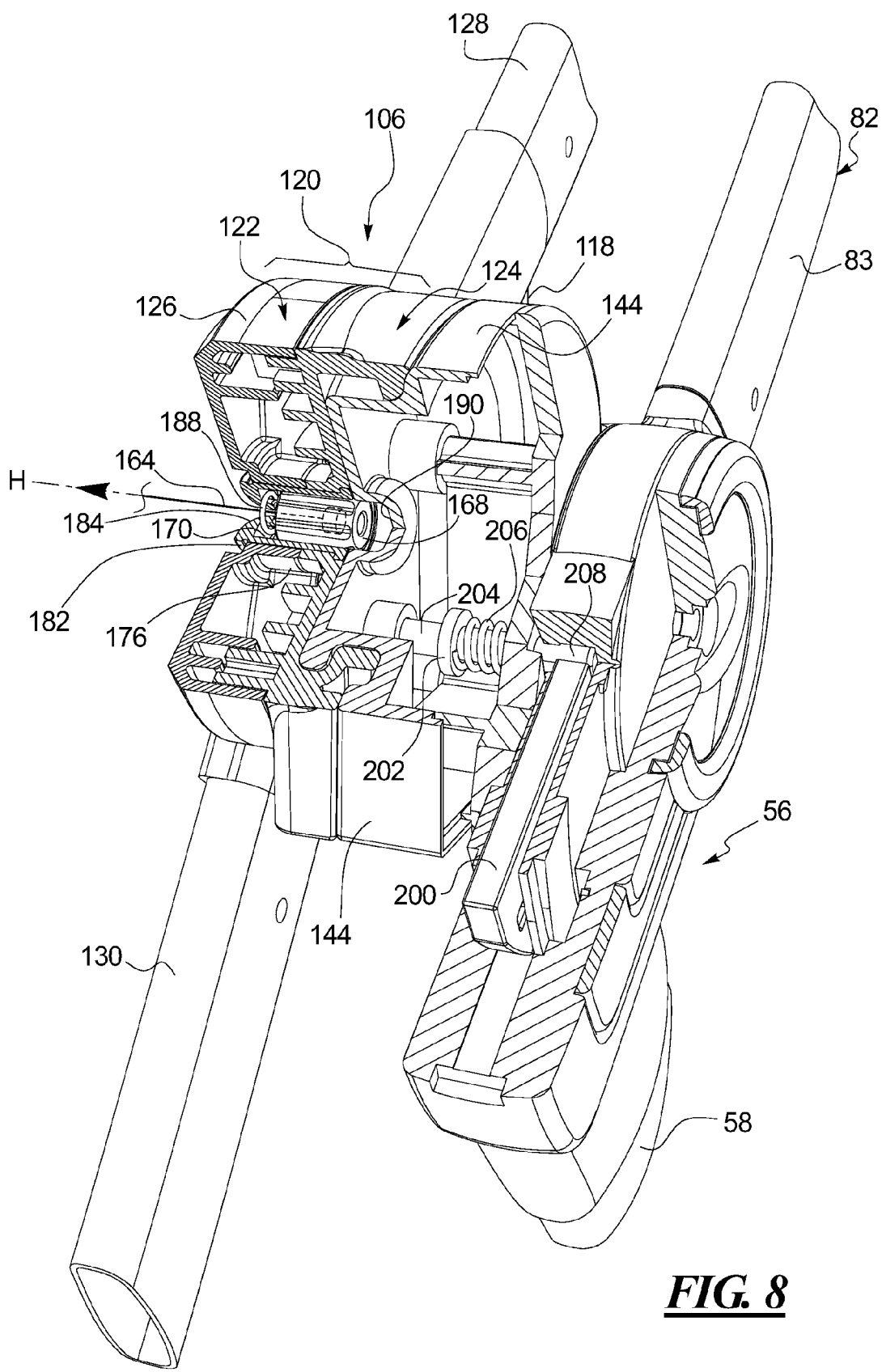
FIG. 8 shows the seat hub and fold joint as shown in FIG. 7, but with the seat assembly latch in a released condition.
Figure 9:
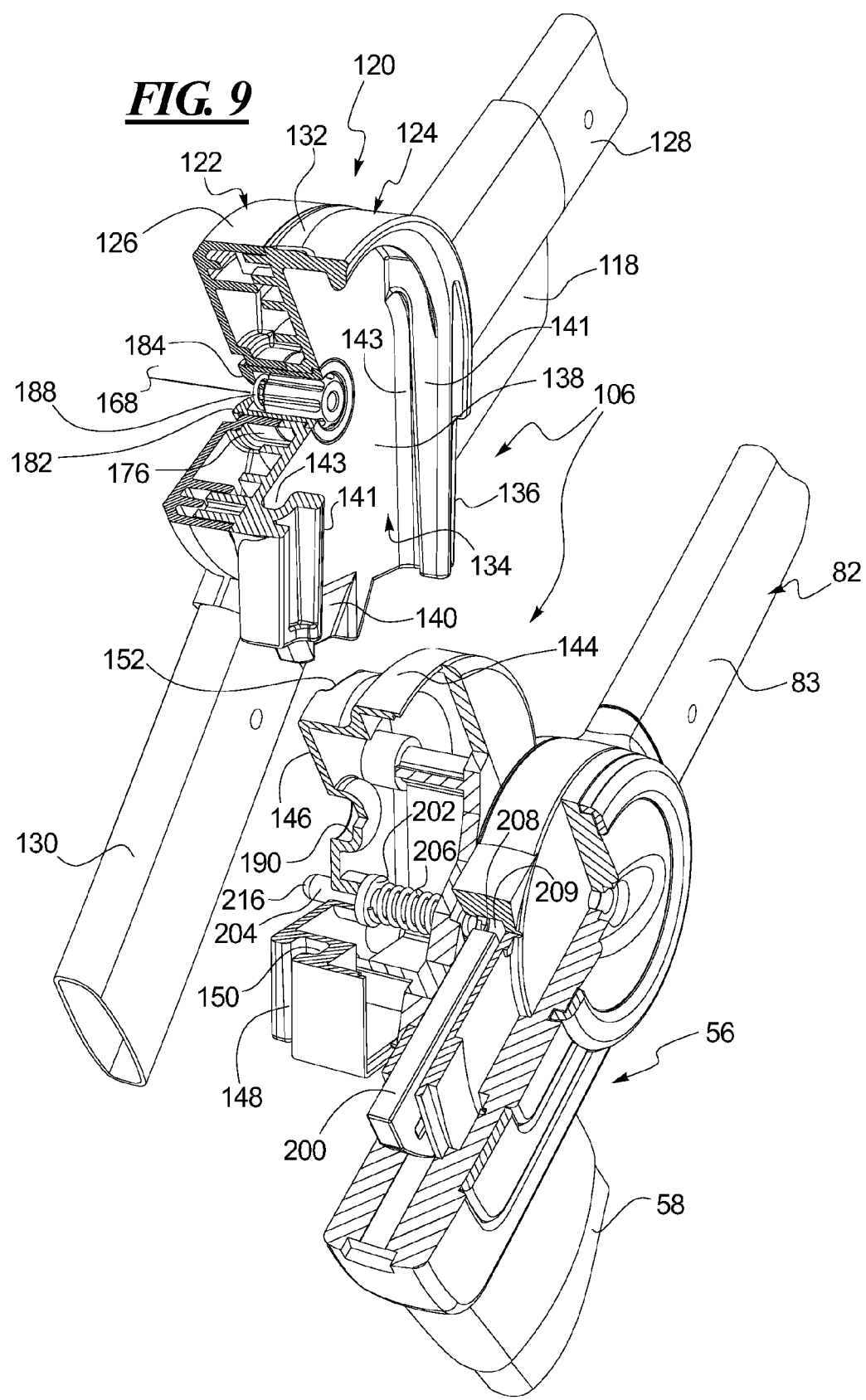
FIG. 9 shows the seat hub and fold joint as shown in FIGS. 7 and 8, but with seat assembly detached from the frame assembly of the stroller.

FIGS. 7-9 show cut-away sections of the seat hub assembly 106 including the seat mounting and release mechanism components. When the seat assembly 100 is mounted to the frame assembly 51, the female seat mount 134 is lowered onto the male seat mount 142. The latch pin 168 will ride along the ramp 152 and be pushed inward into or toward the female seat mount 134 allowing the male and female seat rounds to be connected. As shown in FIG. 7, when the female seat mount 134 is fully seated on the male seat mount 142, the spring 188 fires the latch pin 168 into the opening or receptacle 190. This latches the seat assembly 100 to the frame assembly 51.

The seat assembly 100 can easily be released and removed from the frame assembly 51. A user need only grasp the action end 162 of the release actuator 118 and squeeze the actuator upward or inward into the upper connector 128 in the direction of the arrow Q in FIG. 5. The actuator 118 will pivot about the pivot B. The positioning of the release cable 164 where it is connected to the actuator results in the cable being pulled downward as the release actuator 118 is squeezed upward. The cable 164 will in turn pull the latch pin 168 against the bias of the spring 188 and release the latch pin from the opening or receptacle 190 as shown in FIG. 8. When the latch pin 168 clears the opening 190 in the male seat mount of 142, the seat assembly 100 is free to be lifted from the frame assembly 51 as depicted in FIG. 9.

In the disclosed example, the release actuators 118 are positioned at a distance from the position of the mounting points between the seat assembly 100 and frame assembly 51. The release actuators 118 are also configured in such a way that a user can squeeze the actuators to release the seat assembly 100 and continue to maintain their grip on the seat assembly to lift the seat assembly from the frame assembly 51. The user need not manipulate the actuators to release the seat assembly, release their grip, and then grasp the seat assembly at another location in order to remove the seat assembly from the frame assembly. The design and positioning of the release mechanisms disclosed and described herein thus allows for a simple and easy seat release maneuver. The design also allows a designer to position the release mechanisms at about the center of gravity of the seat, taking into account that a child may be seated in the seat when a user releases the seat from the frame assembly. The disclosed release mechanisms need not be positioned at the location of the seat mounting points. Instead, the release mechanisms can be positioned where necessary to coincide with the seat center of gravity and/or where needed to provide for stable grasping and holding of the seat assembly during use.

FIGS. 7-9 also show cut-away sections of the assembled left side fold joint 56. Each of these figures shows the components in the set-up configuration of the stroller as in FIGS. 1 and 2. As noted above, details, features, and aspects of the fold joints are described in greater detail in co-pending U.S. patent application Ser. Nos. 12/410,243 entitled "Foldable Stroller and Fold Interlock Mechanism" and 12/610,902 entitled "Foldable Stroller and Fold Linkage for Same. In one example, the stroller 50 can employ an optional seat or fold interlock device. The device can inhibit mounting the seat assembly 100 on the stroller until the frame assembly is completely unfolded and in a set-up and latched configuration. The device can also inhibit unlatching and folding of the frame assembly 51 while the seat assembly 100 is mounted to the frame assembly.

With reference to FIGS. 7-9, a fold latch finger 200 cannot be released and the frame assembly 51 in this example cannot be folded while the seat assembly 100 is installed on the stroller 50. A lock pin 202 and the flat face 138 on the female seat mount 134 each act as part of an interlock mechanism in this example. The lock pin 202 and face 138 can cooperate with one another to prevent actuation of the fold latch by locking the latch finger 200 (see FIG. 7) in the latched position. With the frame assembly 51 in the set-up configuration and the seat assembly 100 mounted to the fold joint 56, the flat face 138 on the female seat mount 134 bears against a contact end 204 of the pin 202. The pin is forced outward against the bias force of a pin spring 206. In this locked state or position, a locking end 208 of the pin 202 is aligned with and seats through the hole or notch 209 in the latch finger 200. With the seat assembly 100 mounted to the stroller, the latch finger 200 cannot move. Even if the user were to attempt to actuate the fold actuator 90 (see FIG. 1), which would pull on a cable and the latch finger 200, the locking end 208 of the pin 202 would prevent movement of the latch finger.

In order to fold the frame assembly 51, a user must first remove the seat assembly 100 from the stroller 50 in this example. To do so, a user pulls upward on the release actuators and lifts the seat assembly from the frame assembly 51. When the flat face 138 of the female seat mount 134 clears the contact end 204 of the respective lock pin 202, the pin spring 206 will fire the lock pin inward through the shell cover 144. The locking end 208 of the pin 202 then withdraws from the hole or notch 209 and releases the latch finger 200. This unlocked state or position is shown in FIG. 9.

With the pin 202 free of the latch finger 200, the user is then free to manipulate the fold actuator 90 to fold the frame assembly. Though not described herein, the lock pin 202 can be blocked by part of the fold joint 56 from returning to the locked position when the frame assembly is in a folded configuration. With the frame assembly 51 in the folded configuration, the seat assembly 100 cannot be reinstalled in this example. The interlock pin 202 is retained and blocked in the unlocked state protruding inward from the shell cover 144, preventing attachment of the female seat mount 134. The contact end 204 of the lock pin 202 would block attachment of the female seat mount 134 to the male seat mount 142. The frame assembly 51 must first be unfolded to the set-up configuration in FIG. 1 and the fold latch must then be latched. In this example, the frame assembly 51 can include a storage latch. As shown in FIGS. 1 and 2, a conventional storage latch can be employed to retain the frame assembly 51 in a folded configuration. For example, the storage latch can include a plastic, flexible latch or catch arm 212 mounted to one of the rear legs 58 and a catch pin 214 projecting from the corresponding front leg 62. The catch arm 212 can engage the catch pin 214 when the frame assembly is folded, either manually or automatically, and can be manually released in order to unfold the frame assembly, as is known in the art.

When the stroller frame 51 is unfolded and the latch finger 200 is latched, the hole or notch 209 in the latch finger 200 and the pin 202 are again aligned with one another as in FIG. 9. The pin 202 is still retained in the unlocked position, however, by force of the pin spring 206. The female seat mount 134 can be lowered onto the male seat mount 142. A rounded tip 216 of the lock pin 202 will bear against and ride along the chamfer 140 at the bottom of the flat face 138 and then onto the face as the seat assembly 100 is lowered. The chamfer 140 and face 138 will drive the locking pin 202 against the biasing force of the spring 206 back into the shell cover 144, which in turn drives the locking end 208 into the hole 209 of the latch finger 200. The seat assembly 100 and the interlock mechanism will again prevent the fold joints 56 from being unlatched. The frame assembly 51 cannot be folded until the seat is again removed in this example, as discussed above.

The disclosed interlock mechanism is an optional feature that need not be utilized in conjunction with the stroller seat assembly 100 as disclosed herein. Alternately, the interlock mechanism can vary from the example shown and described herein, as will become evident to those of ordinary skill in the art upon reading this disclosure.

Referring now to FIGS. 4, 5, and 10-13, the disclosed stroller seat assembly also has recline adjustment capability. The incline angle of the entire seat assembly 100, including the upper frame part 102 (inclusive of the seat back, not shown) and the lower frame part 104 (inclusive of the seat bottom, not shown), can be adjusted utilizing the below-described recline mechanism.

The interior, but outward facing side, of the inner center hub 126 has a pair of recline cable tracks 220 formed therein.

Figure 10:
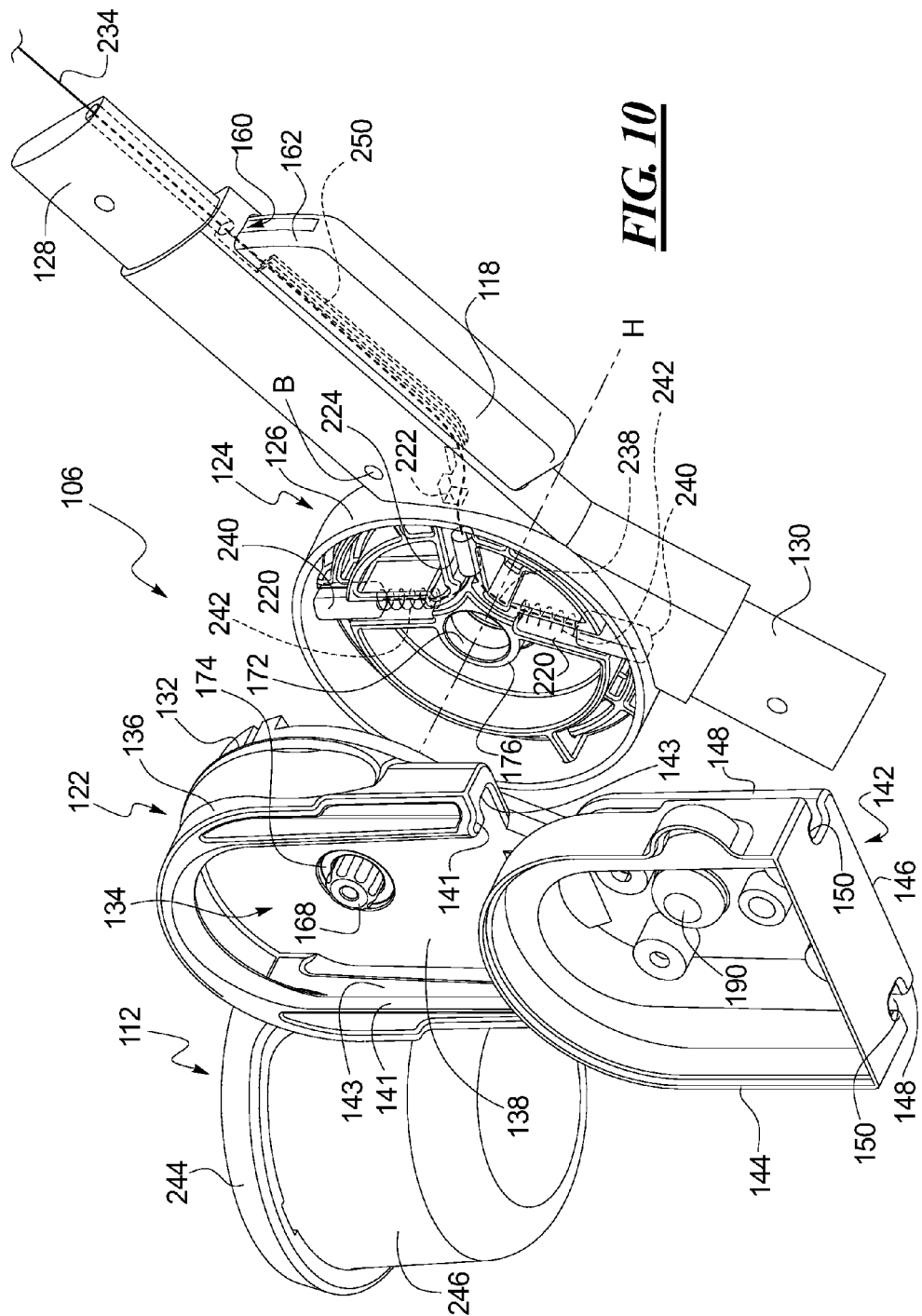
FIG. 10 shows a bottom, outside perspective view of the left side seat hub and a portion of the fold joint depicted in FIG. 9, but with the seat hub housing exploded.
Figure 12:
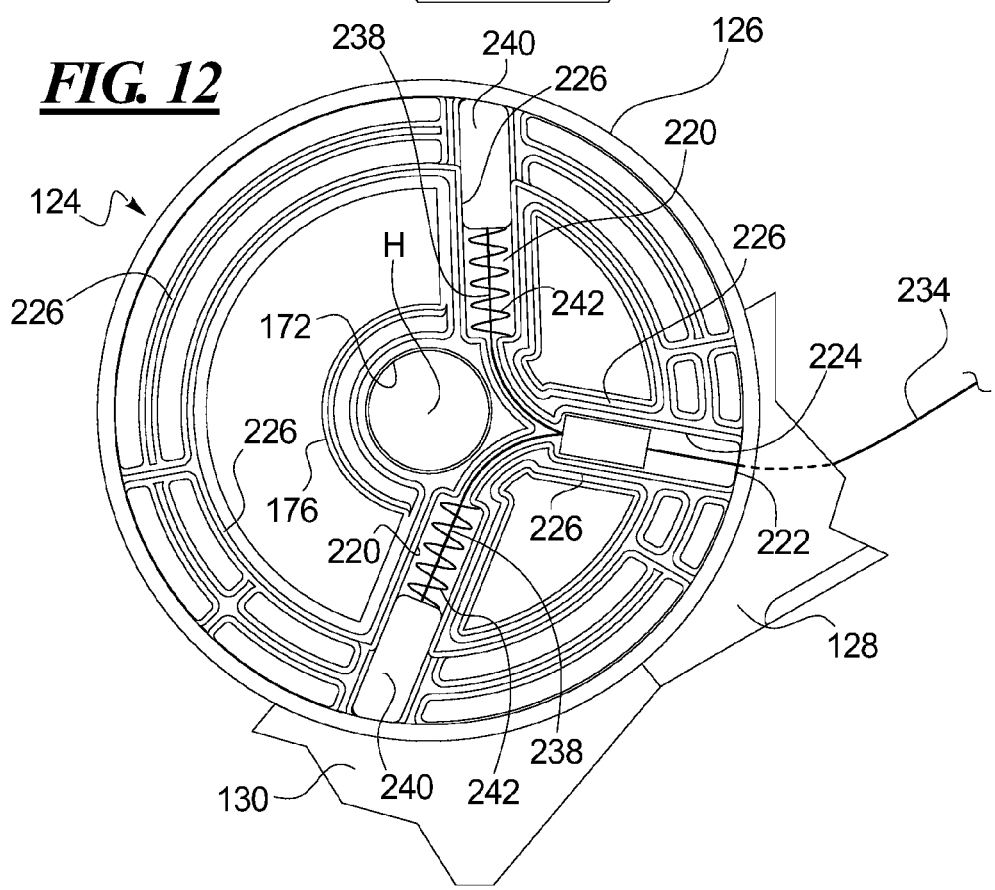
FIG. 12 shows a plan view of the outer facing side on the inner section of the seat hub housing as shown in FIG. 10.

An entry opening 222 on a rear edge of the center hub 126 communicates with an inlet cable track 224. As best illustrated in FIGS. 10 and 12, the inlet cable track 224 splits into the two cable tracks 220, which then diverge in opposite directions from one another. In this example, each of the tracks 220 and 224 are formed by spaced apart molded ribs 226 projecting from the interior surface of the inner center hub 126.

Figure 11:
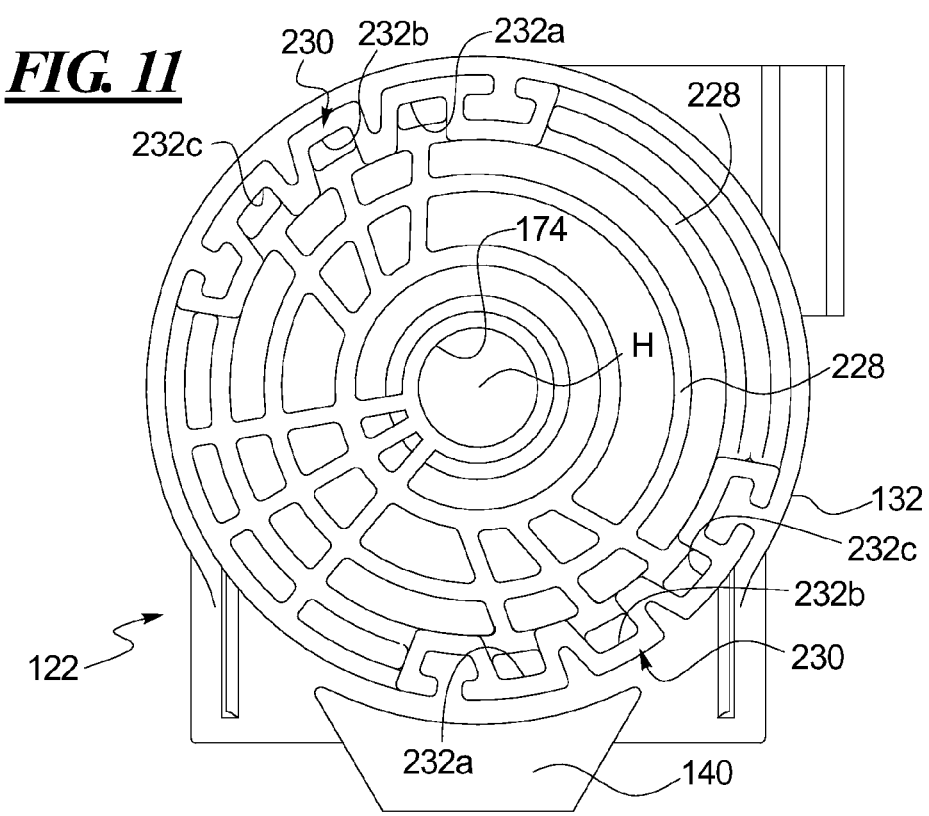
FIG. 11 shows a plan view of the inner facing side on the outer section of the seat hub housing as shown in FIG. 10.

Similarly, the interior, but inner facing side, of the outer center hub 132 also has a plurality of molded ribs 228. A number of these ribs 228 can be configured to form structures to help strengthen the structure of the hub assembly 106 when assembled. However, several of these ribs are specifically configured to create two sets of recline notches 230 on the interior surface of the center hub 132. As best illustrated in FIGS. 5 and 11, the two sets of notches 230 are positioned generally opposite one another across the interior of the outer center hub 132. Each set of 230 includes three adjacent notches 232a, 232b, and 232c that oppose their corresponding notches of the opposite set. The opposed pair of notches 232a are oriented and configured to position the seat assembly 100 in a fully upright position. The opposed pair of notches 232b are oriented and configured to position the seat assembly 100 in an intermediate reclined position. The opposed pair of notches 232c are oriented and configured to position the seat assembly in a fully reclined position. As will be evident to those having ordinary skill in the art, only two recline positions could be provided using only two pairs of opposed notches, or more than three recline positions could be provided using more than the three disclosed pairs of notches.

In the disclosed example, the sets of notches 230 are each formed to face radially inward toward the hub axis H. In this example, the notches are angled or offset relative to an axis extending radially from the hub axis H as best illustrated in FIG. 11. Similarly, the pair of cable tracks 220 are also angled or offset relative to an axis extending radially from the hub axis H as best illustrated in FIG. 12. The disclosed offset angles can assist in reducing the bend angle of the cables used to actuate the recline mechanism. A recline cable 234 extends along the interior of each of the frame legs 108 of the upper seat frame 102 as shown in FIG. 10. Remote ends of the recline cables 234, though not shown herein, are connected to a recline actuator 236 (see FIGS. 1-3) that is carried on the cross member 109 at the top of the upper seat frame 102. In this example, the recline actuator 236 has a forward pivotable paddle 237 that, when rotated, winds up the release cables 234. In another example, the release actuator can be a squeeze-type actuator that is simply squeezed into the seat frame or can a rotary-type actuator that is twisted about an axis of the cross member 109. The recline actuator 236 can vary in configuration and construction and yet the function as intended. Actuation of the recline actuator 236 need only pull on the recline cables 234.

As shown in FIG. 12, the proximal end of each recline cable 234 splits into a pair of cable ends 238. Each cable end 238 terminates at a latch slug 240. The proximal end of the recline cable 234 is routed through the inlet 222 into the inner center hub 126 (or the interior of the hub housing 120) and along the inlet track 224. The cable ends 238 are then routed along a respective one of the split cable tracks 220. When the hub housing 120 is assembled, the interiors of the respective inner center hub 126 and outer center hub 132 face one another to form a closed cavity. However, the center hubs 126 and 132 can be rotated relative to one another about the hub axis H. Any pair of the recline notches 232a, 232b, or 232c can be rotationally aligned with the cable tracks 220. Stops (not shown) can be provided on either one or both of the center hubs 126 and 132 to limit rotational travel of the two center hubs relative to one another. In one example, such stops can be integrally molded as a part of the ribs 226 and/or 228 described above.

Each of the cable ends 232 has a biasing element in the form of a latch spring 242 that is seated within the respective cable track 220. The springs 242 bias the latch slugs 240 in a radial outward direction away from the hub axis H. The springs 242 are arranged so as to bias the slugs 240 into one of the notch pairs when aligned with the slugs. A user can actuate the recline actuator 236 against the bias of the springs 242 to withdraw the reclined cables 234 upward along the frame legs 208. The cables 234 will in turn withdraw the slugs 240 radially inward and out of the notches. This releases the recline mechanisms to permit recline adjustment of the seat assembly. The springs 242 will fire the slugs 240 radially outward into one of the pairs of notches 232a, 232b, or 232c when aligned with the slugs and when the recline actuator 236 is released.

In the disclosed example, the outer hub part 122 is rotationally affixed when the female seat mount 134 is attached to the male seat mount 142 on the fold joint 56. As a result, the sets of notches 230 are also positionally or rotationally fixed when the seat is simply 100 is mounted to the frame assembly 51. The inner hub part 124 thus rotates about the hub axis H relative to the outer hub part 122 when the seat assembly 100 is recline adjusted. However, when the seat assembly 100 is removed from the frame assembly 51, both of the hub parts 122 and 124 detach from the frame assembly 51 along with the seat assembly.

Figure 13:
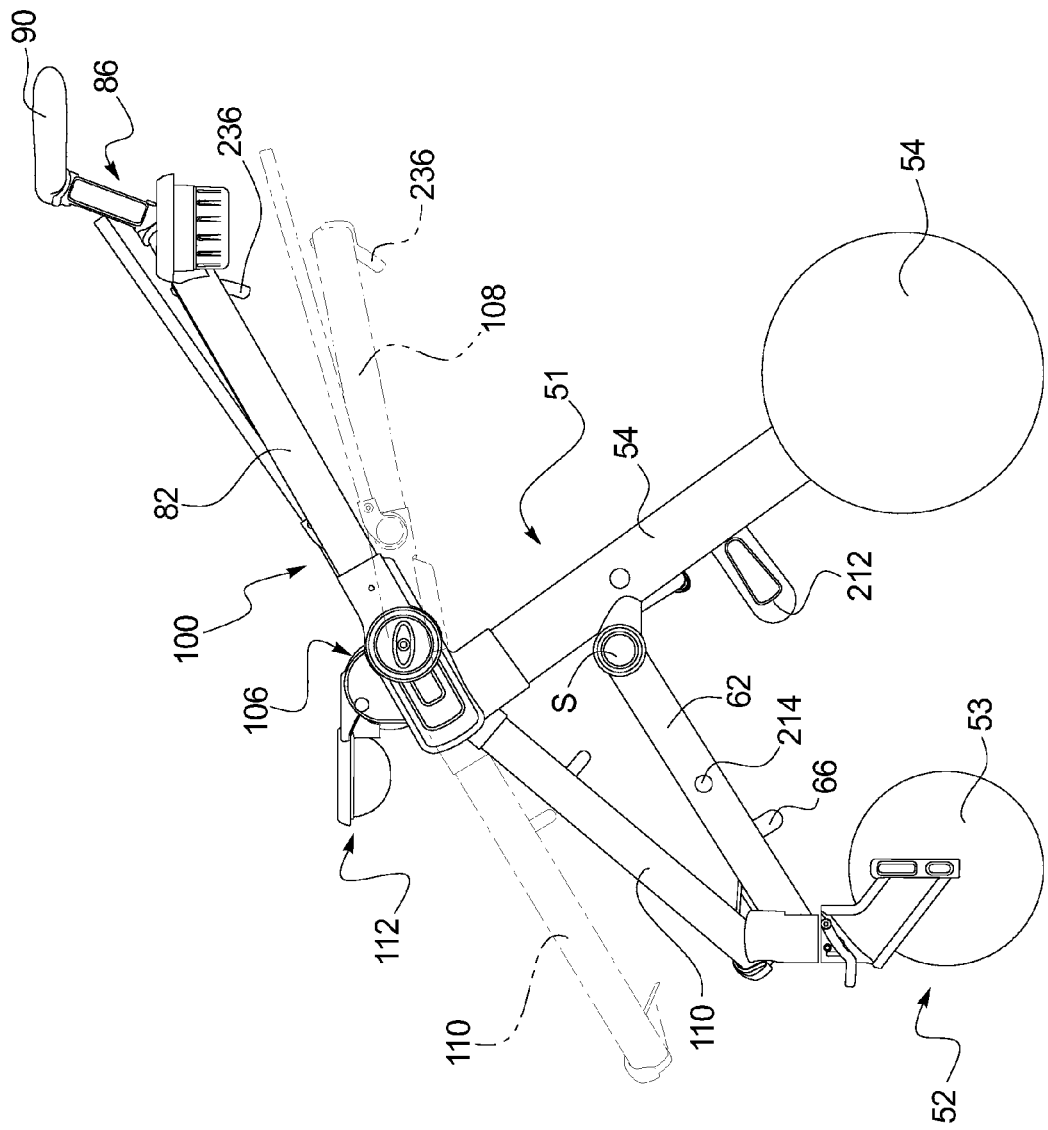
FIG. 13 shows a left side view of part of the frame assembly of the stroller shown in FIG. 1 and shows the seat assembly in a fully upright position and a phantom view of the seat assembly in a fully reclined position.

In the disclosed example, the cup holder 112 is mounted to the outer hub part 124. Thus, the cup holder 112 is also rotationally fixed relative to the frame assembly 51 when the seat assembly 100 is mounted. FIG. 13 shows the seat assembly 100 in a fully upright position whereby the latch slugs 240 would be seated in the recline notches 232a. FIG. 13 also shows the seat assembly 100 in phantom in a fully reclined position whereby the latch slugs 240 would be seated in the recline notches 232c. Regardless of the incline angle of the seat assembly 100 in the disclosed example, the cup holder 112 remains at the same level orientation. Adjustment of the recline angle of the seat assembly does not affect, alter, or change the angle of the cup holder 112.

The cup holder 112 can be partly or entirely integrally molded as a part of the outer hub part 124. Alternatively, the cup holder 112 can include a base, bracket, or ring that secures to the outer hub part 124 when the components are assembled. In such an example, the cup holders 112 can be optionally removable or detachable from the seat assembly 100, as desired. Alternatively, a connection point can be integrally molded or attached to the outer hub part 124 that is configured to connect a removable cup holder structure to the hub part. Such a connection point can also be configured to receive or connect with other devices, other than a cup holder, as noted above. In one example, the connection points for the cup holders on the outer hub parts 124 in this example can be configured to removably attach an ICS adapter to the stroller. In one example, the male seat mount 142, a cup holder ring 244, and cup holder receptacle 246 can be formed as three separate parts assembled to form the cup holder 112. In another example, the male seat mount or the outer center hub 132 can be formed with an integrated support ring 244 and receptacle 246. Alternatively, the receptacles 246 can be independently molded parts that snap into the support rings 244. The support rings 244 can be separate from the male seat mount 142 or outer center hub 132 and be attached with screws or other fasteners, or via a snap-together feature.

Another aspect of the disclosed seat assembly is that the cup holders 112 remain part of the seat assembly 100. Thus, when the seat assembly is removed and reversed, as represented in FIG. 2, the cup holders remain useable to the seat occupant. Further, the cup holders will remain level with the seat mounted in the reverse or rear facing direction, regardless of the seat incline or recline position.

On the stroller disclosed and described herein, the seat assembly 100 is removable and reversible. As a result, the seat assembly can also recline as a single unit. Thus, an arm bar could be provided on the seat and could rotate with the seat, thus not affecting the 8 inch ball test standard noted above. If a tray with cup holders were provided instead of an arm bar on the disclosed seat assembly, the tray would also need to pivot as the seat is reclined in order to comply with the 8 inch ball test standard in any seat position. This would result in potentially spilling contents of containers held in the cup holders on the tray. As the seat reclines, the tray could rotate with the seat assembly through about 30°, for example, potentially spilling its contents onto the child. In this example, a tray could potentially be attached to a non-moving portion of the stroller, such as the frame. However, because the lower portion (seat bottom) of the seat reclines along with the rest of the seat and the tray would span the width of the seat, the 8 inch ball test would then be difficult if not impossible to pass when the seat was reclined.

If provided with an arm bar that rotated with the seat assembly 100, the stroller in this example would not be compatible with an ICS. Thus, this type of stroller, if part of a travel system with ICS, could be sold with a separate ICS adapter to be used in place of the toddler seat assembly 100 when removed. The toddler seat assembly must be completely removed from the stroller frame and replaced by the ICS adapter to mount an ICS to the stroller. Due to the geometry of the removable, reversible toddler seat, it may not be feasible to make the toddler seat assembly compatible for mounting an ICS directly on the stroller seat because the entire seat can be reclined. However, existing travel system customers may be familiar with travel system strollers that permit an ICS to be placed directly into the toddler seat assembly and coupled to the tray or arm bar. Such a precedent could possibly lead to potential misuse of a stroller and ICS because of the existence of the arm bar or tray in this example might lead consumers to believe that they can safely place the ICS into the toddler seat assembly.

In the disclosed example, the foregoing potential problems are avoided by eliminating the use of an arm bar or tray entirely. Instead, the seat assembly 100 includes the cup holders 112 that are positioned on either side of the toddler seat. These cup holders 112 are attached to fixed male connector part of the hub assemblies 106 on the outside of the seat assembly, as depicted in FIGS. 1-3. The male connectors are attached to the seat and removes with the seat. However, when it is attached to the stroller, this part of the hub assembly 106 remains stationary, independent of the seat recline position. The seat assembly can be reclined while the cup holders remain horizontal or level, as noted above. Further, since the front of the seat assembly is open and not encumbered by either a child tray or arm bar, the disclosed stroller and seat assembly also eliminates the above-noted 8 inch ball test-related concerns. Additionally, once the child is old enough to enter/exit the stroller independently, the child does not have to deal with removing a child tray or arm bar in order to access or exit the seat. Still further, the absence of either an arm bar or child tray in this example also discourages consumers from place an ICS directly onto or into the toddler seat assembly 100. Since there is no structure familiar that can visibly support the head end of the ICS, it is less likely that a consumer would mistakenly place an ICS on the stroller depicted in FIG. 1. It would be less obvious to the consumer where the ICS might properly be supported by the seat assembly 100 or frame assembly 51 on the stroller 50.

Also, a typical child tray generally includes a large, cumbersome, molded plastic structure, which requires a lot of resin material to manufacture. An arm bar generally includes a formed and finished metal tube with mechanical devices at the connector ends. The arm bar and tray thus generally would result in a greater component cost and complexity. In comparison, the disclosed cup holder solution may be much simpler and more cost effective. The parts can be all plastic, utilize less resin, and be designed to require no complicated mechanisms or parts to practice the invention.

In another aspect of the disclosed invention, the seat release actuators 118 of the release mechanisms are placed above the seat attachment points. In this example, the release actuators are elongate and easily grasped by being placed under the sweep of the seat frame tube geometry. This seat geometry creates a structure where it can be easy to grasp the seat frame for lifting from the stroller frame while simultaneously actuating the release actuators 118. The release actuators 118 are located nearer to the head end of the seat frame. Thus, these gripping points are aligned closer to the center of gravity of the seat and child when seated in the seat. This can make the seat much more balanced during removal. If a child is not seated in the seat, the seat will be very light and the center of gravity of only the seat will have very little effect on the ability of the user to lift and carry the seat effectively.

Regarding the seat recline mechanisms, one challenge in providing such a compact arrangement at the seat hub assemblies 106 can be in how to route the seat recline cables 234 and release cables 164. In the disclosed example, the recline cables 234 extend in line with and between two sides of the respective seat release actuators (see FIG. 10). The underside of the upper frame connector 128 can be provided with a cable guide or groove 250 that is sandwiched between the sides of the release actuators. The recline cables 234 thus do not interfere with the release actuators 118 and cables 164. Thus, the recline cables 234 bypass the release actuators 118.

In this example, the internal portion of each seat hub assembly is populated with a bulk of the recline mechanism components. Thus, the release actuators are thus connected by means of a direct-pull cable from the actuators to the seat latch pins 168. The cables 164 are routed external to the seat hub assembly 106 so as not to interfere with the recline function. This makes for a relatively simple mechanism. Because the latch pins 168 are located coaxially with the recline or hub pivot axis H, the recline position of the seat does not affect the functionality of the release mechanism. In this example, the release cables could alternatively be routed through the same opening 222 adjacent the recline cables 234 or could be routed along separate guides provided within the hub to the center axis H of the hubs.

Known or existing strollers sometimes employ removable seats. In each, the lifting point or gripping location for holding and removing the seat is at about the center of the seat. If a child were seated in the seat, the gripping points would be well offset from the center of gravity of the occupied seat. One known stroller employs a loop of material for lifting the seat from the stroller. The loop is loose or flexible and is located above the center of the seat and thus would be located closer to the center of gravity of the seat if a child were seated therein. However, the loop does not provide a very stable or sturdy grip on the seat, particularly if the seat were occupied.

The disclosed seat assembly is described as having upper and lower seat frames. These frames could support a fabric seating surface defining a seat back and seat bottom suspended from the frames. A plastic seating surface could also be mounted to the seat frames and have a fabric cover over the plastic seating surfaces. Alternatively, the seat frames could be formed as integral portions of a seat back and seat bottom or be eliminated altogether within the sprit and scope of the present invention. The seat frame terms are thus used broadly herein to refer to, and should be considered synonymous with, an upper seat portion, lower seat portion, seat back, seat bottom, seating structures, and the like.

The hub assemblies 106 are described having inner female and outer male mounting components. These components could be reversed within the scope of the invention. Also, the mounting components and structures can vary from the examples shown and described herein. Similarly, the release and recline mechanisms have been described using specific component shapes, configuration, constructions, and arrangements. These can also be varied from the disclosed examples within the spirit and scope of the present invention. The release actuators 118 can be squeeze-type buttons that translate linearly into the seat frame instead of pivoting about one end. Alternatively, the actuators 118 can be rotatable about an axis of the seat frame tube to release the latch pins. The latch pins can be replaced by other suitable latch mechanisms or devices so as to releasably retain the seat assembly attached to the frame assembly. The recline mechanisms, including the cable arrangement and notch arrangement, can also be varied from the example disclosed and described herein. Routing of the various cables can be altered as well.

Although certain strollers, seat assemblies, and components and features thereof have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
   a frame assembly;
   a seat assembly mounted to the frame assembly;
   a hub assembly carried by the seat assembly and having a hub axis, a first hub part connected to the stroller, and a second hub part connected to the first hub part and to the seat assembly; and
   a cup holder connected to the first hub part,
   wherein the second hub part and the seat assembly can be rotated about the hub axis relative to the first hub part to adjust a recline position of the seat assembly while the cup holder does not rotate therewith, and
   wherein the seat assembly is removable from and attachable to the stroller and the hub assembly and cup holder remain connected to the seat assembly when removed.

2. A stroller according to claim 1, wherein part of the cup holder is integrally molded as a portion of the first hub part.

3. A stroller according to claim 2, wherein the part is a cup holder ring that supports a receptacle.

4. A stroller according to claim 1, further comprising:
   two of the hub assemblies spaced apart from one another on opposite sides of the seat assembly; and
   two of the cup holders, one connected to each of the two hub assemblies.

5. A stroller according to claim 1, further comprising:
   the seat assembly being removable from the frame assembly and adjustable between at least two different recline positions;
   a recline latch mechanism biased to a latching position to retain the seat assembly in a selected one of the recline positions;
   a recline actuator on the seat assembly and coupled to the recline mechanism; and
   a recline cable coupled between the recline actuator and recline mechanism, the recline cable having a proximal end within the hub assembly that is split into a pair of cable ends each having a latch slug forming a part of the recline latch mechanism,
   wherein the recline actuator can be actuated to move the cable, which moves the pair of cable ends and each of the latch slugs to a released position.

6. A stroller according to claim 5, wherein the second hub part and the seat assembly can be rotated about the hub axis relative to the first hub part to adjust between the at least two recline positions while the cup holder does not rotate therewith.

7. A stroller according to claim 5, further comprising:
   two sets of recline notches opposing one another within the first hub part, each set including a plurality of notches and each latch slug positioned to engage any notch of a respective one of the two sets of notches.

8. A stroller according to claim 5, wherein the seat assembly has an upper seat frame and wherein the recline actuator is coupled to a top end of the upper seat frame.

9. A stroller comprising:
   a frame assembly;
   a seat assembly mounted to the frame assembly;
   a hub assembly carried by the seat assembly and having a hub axis, a first hub part connected to the stroller, and a second hub part connected to the first hub part and to the seat assembly; and
   a cup holder connected to the first hub part,
   wherein the second hub part and the seat assembly can be rotated about the hub axis relative to the first hub part to adjust a recline position of the seat assembly while the cup holder does not rotate therewith, and
   wherein the seat assembly has an upper seat frame and a lower seat frame that rotate with one another when the recline position is adjusted.

10. A stroller according to claim 9, wherein second hub part connects the lower seat frame and the upper seat frame to one another.

11. A stroller further comprising:
    a frame assembly;
    a seat assembly mounted to the frame assembly;
    a first seat mount on the frame assembly;
    a second seat mount on the seat assembly and connected to the first seat mount;
    a latch mechanism associated with the first and second seat mounts and biased to a latching position retaining the first and second seat mounts connected to one another;
    a release actuator mounted to the seat assembly and being movable relative to the seat assembly to unlatch the latch mechanism;
    a hub assembly carried by the seat assembly and having a hub axis, a first hub part connected to the stroller, and a second hub part connected to the first hub part and to the seat assembly; and
    a cup holder connected to the first hub part,
    wherein the second hub part and the seat assembly can be rotated about the hub axis relative to the first hub part to adjust a recline position of the seat assembly while the cup holder does not rotate therewith.

12. A stroller according to claim 11, wherein the first seat mount is a male seat mount and the second seat mount is a female seat mount configured to receive the male seat mount therein.

13. A stroller according to claim 11, wherein the second seat mount is part of the hub assembly.

14. A stroller according to claim 13, wherein the latch mechanism includes a latch pin movable along the hub axis.

15. A stroller according to claim 13, wherein the seat assembly has an upper seat frame and a lower seat frame coupled to one another by the hub assembly and the release actuator is positioned above the hub assembly.

16. A stroller according to claim 11, wherein the release actuator is coupled to the latch mechanism by a cable.

17. A stroller according to claim 11, wherein the second seat mount is part of the hub assembly, which has a connector coupled to an upper seat frame of the seat assembly, the release actuator mounted to the connector.

18. A stroller according to claim 17, wherein the latch mechanism includes a latch pin within the hub assembly and wherein a cable is connected to the latch pin and routed therefrom to the release actuator at least partly external to the seat assembly and the hub assembly.

19. A stroller according to claim 11, further comprising:
a pair of the first seat mounts spaced apart from one another across the frame assembly;
a pair of the second seat mounts spaced apart from one another across the seat assembly and each connected to a respective one of the pair of first seat mounts;
a pair of the latch mechanisms one each associated with a respective one of the first and second seat mounts; and
a pair of the release actuators one each for releasing a respective one of the pair of latch mechanisms, each being positioned on the seat assembly above the respective second seat mount.

20. A stroller according to claim 11, wherein the seat assembly is removable from the frame assembly with the latch mechanism unlatched, and wherein the release actuator is positioned on the seat assembly above the second seat mount.

* * * * *